United States Patent
Rong et al.

(10) Patent No.: US 9,537,553 B2
(45) Date of Patent: Jan. 3, 2017

(54) METHOD AND APPARATUS FOR ADJUSTING TRANSMIT POWERS OF BASE STATION ANTENNAS, AND BASE STATION

(71) Applicant: Huawei Technologies Co., Ltd., Shenzhen (CN)

(72) Inventors: Lu Rong, Shanghai (CN); Dageng Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 125 days.

(21) Appl. No.: 14/597,524

(22) Filed: Jan. 15, 2015

(65) Prior Publication Data

US 2015/0124765 A1 May 7, 2015

Related U.S. Application Data

(63) Continuation of application No. PCT/CN2013/074006, filed on Apr. 10, 2013.

(30) Foreign Application Priority Data

Jul. 31, 2012 (CN) .......................... 2012 1 0270184

(51) Int. Cl.
*H04L 1/00* (2006.01)
*H04B 7/04* (2006.01)
(Continued)

(52) U.S. Cl.
CPC ......... *H04B 7/0465* (2013.01); *H04W 52/367* (2013.01); *H04W 72/0473* (2013.01); *H04W 52/42* (2013.01)

(58) Field of Classification Search
CPC ... H04B 10/293; H04B 10/294; H04B 10/296; H04B 10/564; H04J 14/0221; H04W 52/46
(Continued)

(56) References Cited

U.S. PATENT DOCUMENTS

2009/0202020 A1  8/2009  Hafeez
2010/0322343 A1  12/2010 Yeon et al.
(Continued)

FOREIGN PATENT DOCUMENTS

CN  101662826 A   3/2010
CN  102291166 A   12/2011
(Continued)

OTHER PUBLICATIONS

Foreign Communication From a Counterpart Application, European Application No. 13825534.4, Partial Supplementary European Search Report dated Aug. 14, 2015, 8 pages.
(Continued)

*Primary Examiner* — Dady Chery
(74) *Attorney, Agent, or Firm* — Conley Rose, P.C.

(57) ABSTRACT

A method and an apparatus for adjusting transmit powers of base station antennas, and a base station are provided. The method includes receiving an input precoding matrix of a transmit power-limited antenna set, where the precoding matrix is determined according to a scheduling result of a user equipment communicating with a base station in each layer of each subband in a system; adjusting the precoding matrix according to a transmit power limit requirement of the transmit power-limited antenna set, a system capacity improvement requirement, or a coverage performance improvement requirement to obtain an adjusted precoding matrix; and adjusting a stream transmit power of the transmit power-limited antenna set by using the adjusted precoding matrix.

17 Claims, 5 Drawing Sheets

(51) Int. Cl.
*H04W 52/36* (2009.01)
*H04W 72/04* (2009.01)
*H04W 52/42* (2009.01)

(58) Field of Classification Search
USPC  370/310, 317–321, 329, 328, 330; 455/522, 67.11, 68–70, 115.3, 126, 127.1, 455/235, 226.3, 277.2, 296
See application file for complete search history.

(56) References Cited

U.S. PATENT DOCUMENTS

2011/0205118 A1     8/2011  Ojard et al.
2011/0287804 A1*   11/2011  Seo ................... H04W 52/146
                                              455/522

FOREIGN PATENT DOCUMENTS

CN     102420646 A    4/2012
EP       2244390 A2   4/2010

OTHER PUBLICATIONS

Partial English Translation and Abstract of Chinese Patent Application No. CN102420646A, Mar. 13, 2015, 6 pages.
Yu, W., et al., "Transmitter Optimization for the Multi-Antenna Downlink With Per-Antenna Power Constraints," IEEE Transactions on Signal Processing, vol. 55, No. 6, Jun. 2007, pp. 2646-2660.
Foreign Communication From a Counterpart Application, PCT Application No. PCT/CN2013/074006, English Translation of International Search Report dated Jul. 18, 2013, 2 pages.
Foreign Communication From a Counterpart Application, PCT Application No. PCT/CN2013/074006, English Translation of Written Opinion dated Jul. 18, 2013, 11 pages.

* cited by examiner

METHOD AND APPARATUS FOR ADJUSTING TRANSMIT POWERS OF BASE STATION ANTENNAS, AND BASE STATION

CROSS-REFERENCE TO RELATED APPLICATIONS

This application is a continuation of International Application No. PCT/CN2013/074006, filed on Apr. 10, 2013, which claims priority to Chinese Patent Application No. 201210270184.4, filed on Jul. 31, 2012, all of which are hereby incorporated by reference in their entireties.

TECHNICAL FIELD

The present invention relates to radio communication technologies, and in particular to a method and an apparatus for adjusting transmit powers of base station antennas, and a base station.

BACKGROUND

In a radio communication system, certain constraint conditions are imposed on the transmit power of radio signals, and each antenna of many radio remote unit (RRU) products is equipped with an independent power amplifier. Because the output power of a power amplifier is limited, the transmit power of each antenna should not exceed a specified maximum transmit power of the antenna. Many RRU products implement power sharing between antennas. Therefore, the transmit power of each RRU should not exceed a specified maximum transmit power of the RRU. When a large number of transmit antennas are used in a cell, considering costs and other aspects, multiple RRUs may be used together, which requires that the transmit power of each cell should not exceed a specified maximum transmit power of the cell. Because a uniform power supply is provided for multiple cells of a base station, another possible constraint condition is that the transmit power of each base station should not exceed a specified maximum transmit power of the base station.

The transmit power constraint conditions may be collectively represented by a power-limited antenna set. Regarding an antenna power limit, an RRU power limit, a cell power limit, and a base station power limit, each power-limited antenna set respectively corresponds to a transmit antenna, all transmit antennas of an RRU, all transmit antennas of a cell, and all transmit antennas of a base station. Different power-limited antenna sets may have different maximum transmit power limits. The total transmit power of all antennas in each power-limited antenna set should not exceed a corresponding maximum transmit power.

In a practical system, the base stations of different specifications may be used to implement different power limits. For example, in a heterogeneous network, the maximum transmit power of a macro cell antenna is different from the maximum transmit power of a micro cell antenna. Therefore, the transmit power constraint conditions in a radio communication system may be completely represented by a combination of various power-limited antenna sets.

To further enhance capacity of a radio communication system, a coordinated multi-point (CoMP) technology in researches of standards such as Third Generation Partnership Project (3GPP) Long Term Evolution (LTE) attracts more and more attention and is extensively studied. When the CoMP technology is applied between base stations, the path loss from each user to each base station varies sharply, and the power allocated to each power-limited antenna set after precoding varies sharply. Therefore, the transmit power of each power-limited antenna set, which is calculated according to a general method, tends to exceed the maximum transmit power limit easily.

Generally a relatively practical technical solution in engineering to solve such a problem is reducing the powers of all base station antennas evenly to satisfy the transmit power constraint conditions in the radio communication system. After a basic precoding matrix W is obtained (the precoding matrix includes precoding matrices of M subbands, that is, $W_m$ (m=1, 2, ..., M)), the precoding matrix is multiplied by a certain power reduction factor $\alpha$ less than 1, that is, the transmit powers of all base station antennas are reduced to a certain extent evenly:

$$W_m = \alpha \cdot W_m.$$

The easiest way of setting the power reduction factor is to reduce the power by 3 decibels (dB) directly:

$$W_m = \frac{1}{\sqrt{2}} \cdot W_m.$$

A better way is to first estimate a transmit power $P_n$ of each antenna according to a precoding matrix, and then set the power reduction factor by reducing the largest value to satisfy the requirement of the maximum transmit power limit $P_{max}$:

$$W_m = \frac{\sqrt{P_{max}}}{\max\{P_n\}} \cdot W_m.$$

Although the maximum transmit power limit can be met by simply reducing the transmit powers of all base station antennas to a certain extent evenly, the technical solution reduces the transmit powers of all base station antennas evenly without discrimination. Therefore, the transmit power of the power-limited antenna set whose transmit power does not exceed the maximum transmit power limit is reduced to a lower level, which leads to unnecessary loss of performance of coverage and capacity and deteriorates network performance such as coverage and capacity apparently.

SUMMARY

The present invention provides a method and an apparatus for adjusting transmit powers of base station antennas, and a base station to solve problems caused by the prior art, such as unnecessary loss of performance of coverage and capacity of base station antennas.

In one aspect, the present invention provides a method for adjusting transmit powers of base station antennas, including receiving an input precoding matrix of a transmit power-limited antenna set, where the precoding matrix is determined according to a scheduling result of a user equipment (UE) communicating with a base station in each layer of each subband in a system; and adjusting the precoding matrix according to a transmit power limit requirement of the transmit power-limited antenna set, a system capacity improvement requirement, or a coverage performance improvement requirement to obtain an adjusted precoding matrix, and adjusting a stream transmit power of the transmit power-limited antenna set by using the adjusted precoding matrix, where the stream transmit power of the transmit power-limited antenna set is a sum of powers for transmitting a stream of the transmit power-limited antenna set on all antennas in the transmit power-limited antenna set, and the stream is data sent in a layer of a subband in the system to the UE.

According to another aspect, the present invention provides an apparatus for adjusting transmit powers of base station antennas, including a precoding matrix receiving module configured to receive an input precoding matrix of a transmit power-limited antenna set, where the precoding matrix is determined according to a scheduling result of a UE communicating with a base station in each layer of each subband in a system; and a power adjusting module configured to adjust the precoding matrix according to a transmit power limit requirement of the transmit power-limited antenna set, a system capacity improvement requirement, or a coverage performance improvement requirement to obtain an adjusted precoding matrix, and adjust a stream transmit power of the transmit power-limited antenna set by using the adjusted precoding matrix, where the stream transmit power of the transmit power-limited antenna set is a sum of powers for transmitting a stream of the transmit power-limited antenna set on all antennas in the transmit power-limited antenna set, and the stream is data sent in a layer of a subband in the system to the UE.

According to still another aspect, the present invention provides a base station, which includes antennas and the apparatus for adjusting transmit powers of base station antennas, where the apparatus for adjusting transmit powers of base station antennas is used to adjust the transmit powers of the antennas.

The technical effects of the method and apparatus for adjusting the transmit powers of base station antennas and the base station in the present invention are as follows. By adjusting the stream transmit power, the present invention solves the problems caused by the prior art such as unnecessary loss of performance of coverage and capacity because in the prior art, the transmit powers of all base station antennas are reduced evenly without discrimination and the transmit power of the power-limited antenna set whose transmit power does not exceed the maximum transmit power limit is reduced to a lower level. Thereby, performance such as network coverage and capacity of a base station system is improved.

DETAILED DESCRIPTION

Figure 1:
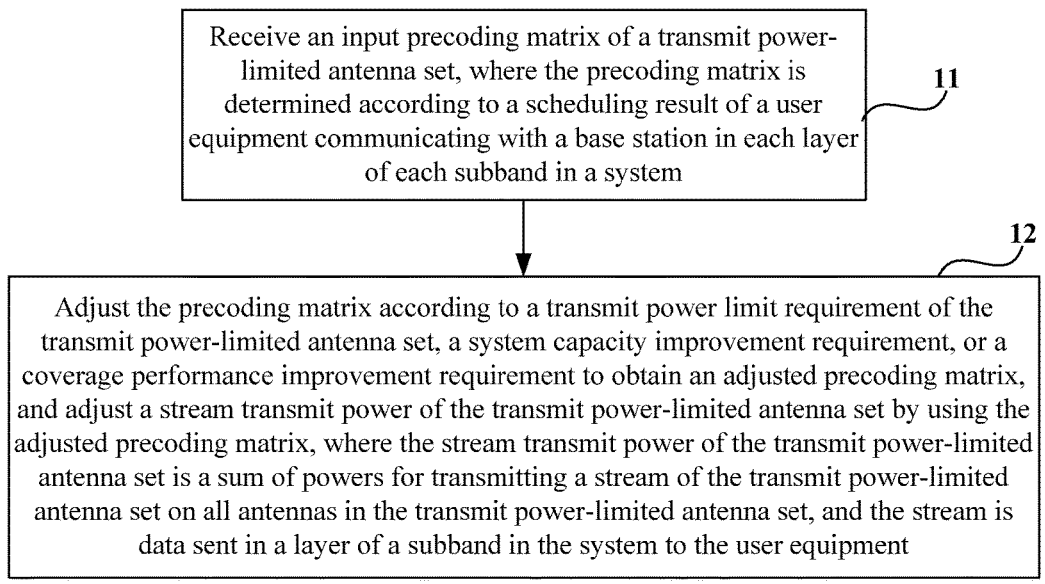
FIG. 1 is a flowchart of a method for adjusting transmit powers of base station antennas according to an embodiment of the present invention.

FIG. 1 is a flowchart of a method for adjusting transmit powers of base station antennas according to an embodiment of the present invention. As shown in FIG. 1, the method includes the following steps.

Step 11. Receive an input precoding matrix of a transmit power-limited antenna set, where the precoding matrix is determined according to a scheduling result of a UE communicating with a base station in each layer of each subband in a system.

The precoding matrix is a complex matrix in baseband digital signal processing, and is dimensionless.

The transmit power of an antenna is the power of a radio frequency analog signal s_RF output by the antenna, with a physical dimension W and a metric unit decibel-milliwatt (dBm).

Generally, a linear relationship exists between the baseband digital signal s_BS and the radio frequency analog signal s_RF transmitted by the antenna: $s\_RF=C\times s\_BS$, where s_BS is dimensionless, the unit of s_RF is W, and the unit of the factor C is also W. All the three quantities are complex numbers.

Therefore, the power of the baseband digital signal (average modulus square of s_BS in a period, dimensionless) is also in a linear relationship with the power of the radio frequency analog signal (average energy of s_RF in a period), with the scale factor being a modulus square of C.

In the baseband, a relationship between the digital signal s_BS in the time domain and the precoding matrix P in the frequency domain is as follows.

The precoding matrix P in the frequency domain decides the power of the baseband digital signal s_BS in the time domain. The s_BS is jointly decided by the input signals of each stream and the precoding matrix. However, the input signal of each stream in the frequency domain is normalized, and does not affect the power of s_BS. Therefore, the precoding matrix P decides the power of s_BS, and also decides the power of s_RF.

Step 12. Adjust the precoding matrix according to a transmit power limit requirement of the transmit power-limited antenna set, a system capacity improvement requirement, or a coverage performance improvement requirement to obtain an adjusted precoding matrix, and adjust a stream transmit power of the transmit power-limited antenna set by using the adjusted precoding matrix, where the stream transmit power of the transmit power-limited antenna set is a sum of powers for transmitting a stream of the transmit power-limited antenna set on all antennas in the transmit power-limited antenna set, and the stream is data sent in a layer of a subband in the system to the UE. The stream corresponds to a layer of a subband in an orthogonal frequency division multiple access (OFDMA) system, and the transmit power of an antenna is in proportion to a sum of modulus squares of elements of precoding vectors of all layers of all subbands on the antenna. "Layer" is a basic concept in the 3GPP LTE protocol, and, to put it simply, is a spatial data processing dimension corresponding to a precoding vector.

Compared with the input precoding matrix, the output precoding matrix has a different gain in each stream. The gain adjustment in a layer of a subband will change the power on all antennas. Once the stream transmit power is adjusted, the antenna transmit power is adjusted, and the allocation of the antenna transmit power to each stream is adjusted.

The adjusting the precoding matrix according to a transmit power limit requirement of the transmit power-limited antenna set to obtain an adjusted precoding matrix, and adjusting a stream transmit power of the transmit power-limited antenna set by using the adjusted precoding matrix include obtaining a power matrix according to the precoding matrix, where a sum of powers in a row of the power matrix is an antenna transmit power of an antenna, a sum of powers in a column is a stream transmit power of a stream, and the stream is a layer of a subband in the transmit power-limited antenna set.

A largest antenna transmit power is obtained according to the power matrix. By using the largest antenna transmit power and a preset antenna power threshold, the precoding matrix is adjusted to obtain an adjusted precoding matrix, and a stream transmit power of at least one stream is adjusted by using the adjusted precoding matrix. The stream transmit power of each of the at least one stream corresponds to each of at least one column of the power matrix, where the at least one column is at least one column that comes first in the power matrix after all columns are sorted in descending order of powers in a row that has the largest antenna transmit power.

The stream is data in a layer of a subband in an OFDMA system, and the transmit power of an antenna is in proportion to a sum of modulus squares of elements of precoding vectors of all layers of all subbands on the antenna.

Alternatively, the adjusting the precoding matrix by using the largest antenna transmit power and a preset antenna power threshold, and adjusting a stream transmit power of at least one stream by using the adjusted precoding matrix include subtracting the antenna power threshold from the largest antenna transmit power to obtain a first surplus power; subtracting the first surplus power from a sum of powers to be adjusted in a first specific row, and dividing a result of the subtraction by the number of powers to be adjusted to obtain a second surplus power, where the first specific row is a row in which a sum of powers is the largest antenna transmit power in the power matrix, the power to be adjusted is a first power in the first specific row after all powers are sorted in descending order, and the number of powers to be adjusted is 1; if the second surplus power is greater than the first power, dividing the second surplus power respectively by each of the powers to be adjusted to obtain a first adjustment factor of each of the powers to be adjusted, where powers in a same column of the power matrix have a same adjustment factor, and the first power is the largest power other than the powers to be adjusted in the first specific row; multiplying the first adjustment factor by a second adjustment factor to obtain a cumulative adjustment factor, where the second adjustment factor is an original cumulative adjustment factor of each of the powers to be adjusted; and adjusting the precoding matrix according to the obtained cumulative adjustment factor, and adjusting, by using the adjusted precoding matrix, a stream transmit power corresponding to a column that includes the powers to be adjusted.

Alternatively, the adjusting, by using the largest antenna transmit power and a preset antenna power threshold, the precoding matrix to obtain an adjusted precoding matrix, and adjusting a stream transmit power of at least one stream by using the adjusted precoding matrix further include, if the second surplus power is not greater than the first power, adding the first power to the powers to be adjusted; after the number of powers to be adjusted increases by 1, subtracting the first surplus power from the sum of powers to be adjusted in the first specific row, and then dividing a result of the subtraction by the number of powers to be adjusted until the second surplus power is greater than the first power.

Alternatively, after the dividing the second surplus power respectively by each of the powers to be adjusted and before the multiplying the first adjustment factor by the second adjustment factor, the method further includes adjusting, by using the first adjustment factor, all powers in the column that includes the powers to be adjusted to obtain a new power matrix; and obtaining a largest antenna transmit power according to the new power matrix; if the largest antenna transmit power is not greater than an antenna power threshold, multiplying the first adjustment factor by the second adjustment factor to obtain a cumulative adjustment factor, adjusting the precoding matrix according to the obtained cumulative adjustment factor, and adjusting, by using the adjusted precoding matrix, the stream transmit power corresponding to the column that includes the powers to be adjusted; and if the largest antenna transmit power is greater than the antenna power threshold, adjusting, by using the largest antenna transmit power and the preset antenna power threshold, the precoding matrix to obtain an adjusted precoding matrix, and adjusting the stream transmit power of at least one stream by using the adjusted precoding matrix.

Alternatively, the adjusting the precoding matrix according to the obtained cumulative adjustment factor includes mapping a sequence number of a stream corresponding to the column that includes the powers to be adjusted to a subband sequence number and a layer sequence number, and adjusting, according to the obtained cumulative adjustment factor, the precoding matrix in a subband mapped to the sequence number of the stream corresponding to the column that includes the powers to be adjusted.

Alternatively, the adjusting the precoding matrix according to a system capacity improvement requirement or a coverage performance improvement requirement, and adjusting a stream transmit power by using the adjusted precoding matrix include obtaining an estimated value of a received signal-to-noise ratio of each UE according to reference signal received quality (RSRQ); obtaining a power allocation factor of each stream according to a total power threshold and the estimated value of the received signal-to-noise ratio of each UE, where a stream is a layer of a subband; and adjusting the precoding matrix by using the power allocation factor, and adjusting a stream transmit power of each stream respectively by using the adjusted precoding matrix, so that the antenna transmit power meets the system capacity improvement requirement or the coverage performance improvement requirement.

Alternatively, the obtaining a power allocation factor of each stream according to a total power threshold and the estimated value of the received signal-to-noise ratio of each UE includes obtaining the stream transmit power of each stream by using the estimated value of the received signal-to-noise ratio of each UE; adding up obtained stream transmit powers of all streams to obtain a total antenna transmit power; dividing the total power threshold by the total antenna transmit power to obtain a power allocation adjustment factor; and multiplying the power allocation adjustment factor by the stream transmit power of each stream respectively, and extracting a square root to obtain a power allocation factor of each stream.

Alternatively, before obtaining an estimated value of a received signal-to-noise ratio of each UE according to RSRQ, the method further includes grouping all subbands into Q first subband groups, where Q is an integer greater than 1.

The obtaining a power allocation factor of each stream according to a total power threshold and the estimated value of the received signal-to-noise ratio of each UE includes obtaining a power allocation factor of each stream in each first subband group respectively according to the total power threshold and the estimated value of the received signal-to-noise ratio of each UE.

The adjusting the precoding matrix by using the power allocation factor, and adjusting a stream transmit power of each stream respectively by using the adjusted precoding matrix include adjusting the precoding matrix by using the power allocation factor, and adjusting the stream transmit power of each stream in each first subband group respectively by using the adjusted precoding matrix.

Alternatively, after adjusting the precoding matrix by using the power allocation factor and adjusting the stream transmit power of each stream in each first subband group respectively by using the adjusted precoding matrix, the method further includes grouping all subbands into R second subband groups, where R is an integer greater than 1; obtaining a subband group power matrix corresponding to each second subband group according to the precoding matrix, where a sum of powers in a row of the subband group power matrix is an antenna transmit power of a second subband group part of an antenna, a sum of powers in a column is a stream transmit power of a stream, and the stream is a layer of a subband in the transmit power-limited antenna set; and obtaining a largest antenna transmit power of the second subband group part in each second subband group respectively according to the subband group power matrix, adjusting the precoding matrix by using a preset antenna power threshold and the largest antenna transmit power of the second subband group part in each second subband group, and adjusting stream transmit powers of R stream groups respectively by using the adjusted precoding matrix, where a stream group is at least one stream in a second subband group, a stream transmit power of a stream group is a stream transmit power corresponding to a part of columns in a corresponding subband group power matrix, and the part of columns in the corresponding subband group power matrix are at least one column, which, after all columns are sorted in descending order of powers in a row that has the largest antenna transmit power of the second subband group part, comes first in the subband group power matrix corresponding to a second subband group that includes the stream group.

Alternatively, the adjusting the precoding matrix by using a preset antenna power threshold and the largest antenna transmit power of the second subband group part in each second subband group, and adjusting stream transmit powers of R stream groups respectively by using the adjusted precoding matrix include subtracting an average antenna power threshold from the largest antenna transmit power of the second subband group part in each second subband group to obtain a first surplus power, where the average antenna power threshold is a value obtained by dividing the preset antenna power threshold by R; subtracting the first surplus power from a sum of powers to be adjusted in a first specific row of each subband group power matrix, and dividing a result of the subtraction by the number of powers to be adjusted to obtain a second surplus power, where the first specific row is a row in which a sum of powers is the largest antenna transmit power of the second subband group part in each subband group power matrix, and the powers to be adjusted are at least one power that comes first in the first specific row after all powers are sorted in descending order; if the second surplus power is greater than the first power, dividing the second surplus power respectively by each of the powers to be adjusted to obtain a first adjustment factor of each of the powers to be adjusted, where powers in a same column of the subband group power matrix have a same adjustment factor, and the first power is the largest power other than the powers to be adjusted in the first specific row; multiplying the first adjustment factor by a second adjustment factor to obtain a cumulative adjustment factor, where the second adjustment factor is an original cumulative adjustment factor of each of the powers to be adjusted; and adjusting the precoding matrix according to the obtained cumulative adjustment factor, and adjusting, by using the adjusted precoding matrix, a stream transmit power corresponding to a column that includes the powers to be adjusted in each second subband group.

Alternatively, the adjusting the precoding matrix by using a preset antenna power threshold and the largest antenna transmit power of the second subband group part in each second subband group, and adjusting stream transmit powers of R stream groups respectively by using the adjusted precoding matrix further include, if the second surplus power is not greater than the first power, adding the first power to the powers to be adjusted; subtracting the first surplus power from the sum of powers to be adjusted in the first specific row of each subband group power matrix, and then dividing a result of the subtraction by the number of powers to be adjusted.

Alternatively, after the dividing the second surplus power respectively by each of the powers to be adjusted and before the multiplying the first adjustment factor by the second adjustment factor, the method further includes adjusting, by using the first adjustment factor, all powers in the column that includes the powers to be adjusted, obtaining a largest antenna transmit power of the second subband group part in each second subband group respectively according to the subband group power matrix, adjusting the precoding matrix by using a preset antenna power threshold and the largest antenna transmit power of the second subband group part in each second subband group, and adjusting stream transmit powers of R stream groups respectively by using the adjusted precoding matrix, where a stream group is at least one stream in a second subband group.

Alternatively, the adjusting the precoding matrix according to the obtained cumulative adjustment factor includes mapping a sequence number of a stream corresponding to the column that includes the powers to be adjusted in each second subband group to a subband sequence number and a layer sequence number, and adjusting, according to the obtained cumulative adjustment factor, the precoding matrix in a subband mapped to the sequence number of the stream corresponding to the column that includes the powers to be adjusted.

The method for adjusting transmit powers of base station antennas in the embodiments of the present invention adjusts a precoding matrix, adjusts the stream transmit power by using the adjusted precoding matrix, and adjusts the transmit powers of the base station antennas discriminatingly, thereby solving the problems caused by the prior art such as loss of performance of coverage and capacity because in the prior art, the transmit powers of all base station antennas are reduced evenly without discrimination. For example, a part of the stream transmit powers are adjusted, the precoding matrix is adjusted according to a signal-to-noise ratio, and the adjusted precoding matrix is used to adjust the stream transmit power, thereby improving coverage and capacity performance of the system and improving system throughput.

The following describes the method in detail with reference to Embodiment 1 to Embodiment 3.

Embodiment 1

Figure 2:
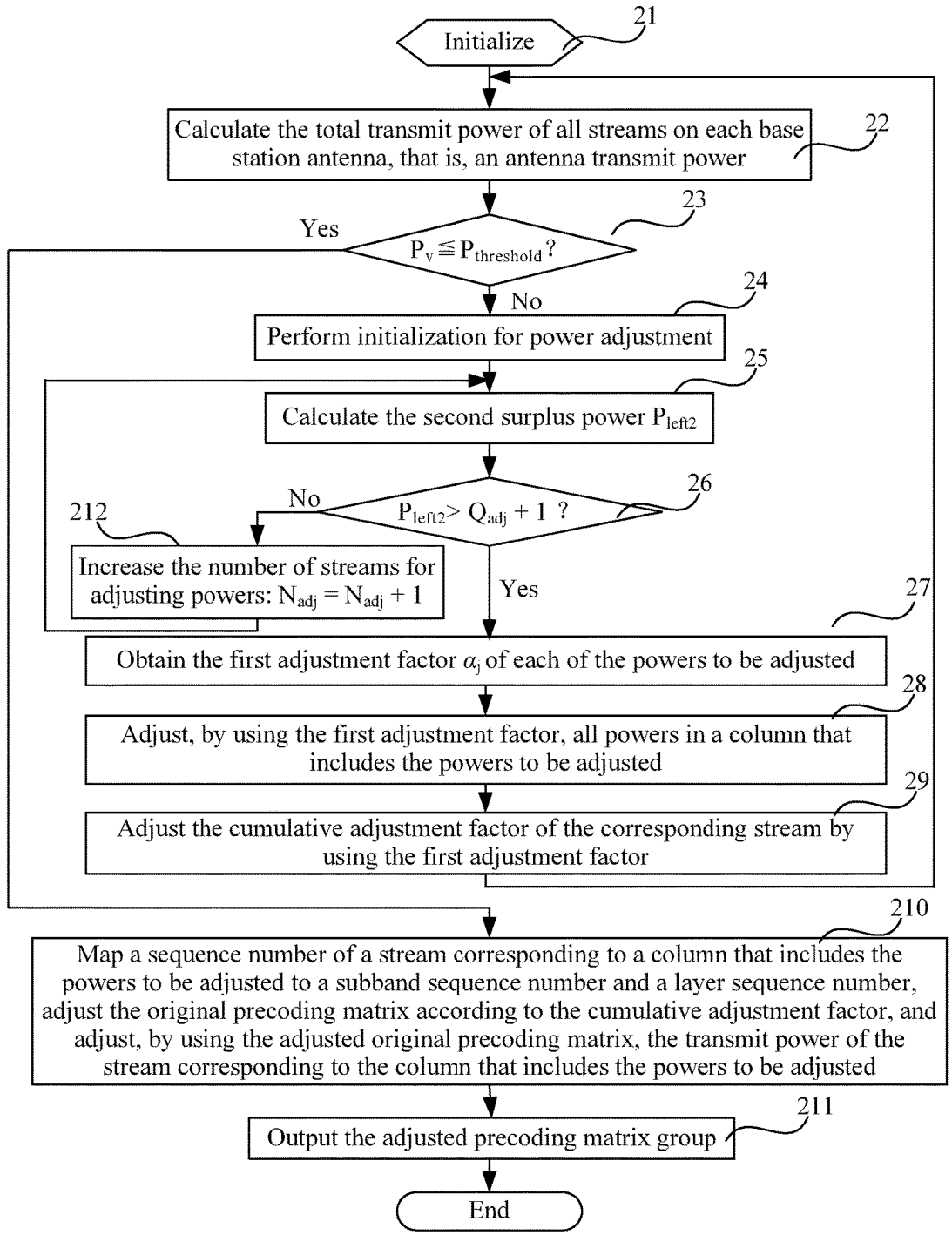
FIG. 2 is a flowchart of another method for adjusting transmit powers of base station antennas according to an embodiment of the present invention.

In this embodiment, it is assumed that the maximum transmit power of each antenna does not exceed $P_{max}$, that is, each transmit antenna is a power-limited antenna set, and the maximum transmit power limit of each power-limited antenna set is $P_{max}$. After an input precoding matrix W of the transmit power-limited antenna set is received, the input precoding matrix of the transmit power-limited antenna set is adjusted, and the adjusted precoding matrix is used to adjust the stream transmit power. As shown in FIG. 2, the detailed adjustment steps include the following.

Step 21. Perform Initialization:

a) Set an antenna power threshold: $P_{threshold}=\beta^{P}_{max}$:

where, $P_{max}$ is the maximum transmit power limit of each power-limited antenna set, and is a normalized antenna power value corresponding to the antenna power limit, and, in this embodiment, is equal to the number of subbands divided by the number of antennas, that is, $P_{max}=20/4=5$. $\beta$ is a real number factor and is used to adjust peak-to-average power ratio (PAPR) performance, and the value of $\beta$ depends on actual conditions. The antenna power threshold is a flexible limit related to (nonlinear) performance loss on the basis of the maximum transmit power limit, and therefore, in fact, on condition that the outband leakage meets requirements, the maximum transmit power limit may exceed to a certain extent as long as the performance loss is acceptable. In this embodiment, the value of $\beta$ is set to 1.

b) Set an initial value of the precoding matrix W' to be equal to the input original precoding matrix W.

c) According to the precoding matrix sorted by subband and layer, calculate a power matrix sorted by stream:

$P(n,mL+l)=|W_m(n,l)|^2$, $1 \le m \le N_{subband}$, $1 \le n \le N_{Tx}$, $1 \le l \le L$, where, n represents the $n^{th}$ row or the $n^{th}$ antenna, m represents the $m^{th}$ group of columns or the $m^{th}$ subband, l represents the $l^{th}$ layer of the subband, $N_{subband}$ is the number of subbands, that is, the number of groups of columns of the power matrix, $N_{TX}$ is the number of antennas, that is, the number of rows of the power matrix, and L is the number of layers in a subband.

d) Set an initial value of the cumulative adjustment factor of streams:

$\alpha_c(i)=1$, $1 \le i \le N_{subband}L$, where, i is the $i^{th}$ column of the power matrix or the $i^{th}$ stream.

Step 22. Calculate the total transmit power of all streams on each base station antenna, that is, an antenna transmit power $P_n$:

$$P_n = \sum_i P(n, i), 1 \le n \le N_{Tx},$$

where, P(n, i) represents the $i^{th}$ power in the $n^{th}$ row, and evidently, the antenna power of one antenna is the sum of powers in a row of the foregoing power matrix.

Step 23. Among the antenna transmit powers obtained in step 22, find the largest antenna transmit power $\max\{P_n\}=P_v$, and compare $P_v$ with the antenna power threshold $P_{threshold}$; if the largest base station antenna transmit power $P_v \le P_{threshold}$, perform step 210; otherwise, proceed to step 24.

Step 24. Perform initialization for power adjustment.

a) Sort the powers in all columns of the power matrix in descending order of the powers in the row that has the largest antenna transmit power, where the powers in the row that has the largest antenna transmit power are sorted as follows:

$[Q_1 Q_2 \ldots Q_{N_{subband}L}]=\text{sort}\{[P(v,1)P(v,2) \ldots P(v,N_{subband}L)]\}$.

The mapping relationship before and after the sorting is:

$Q_j=P(v,q(j))$, $Q_1 > Q_2 > \ldots > Q_{N_{subband}L}$ b) Calculate the first surplus power:

$P_{left1}=P_v-P_{threshold}$.

c) The initial value of the powers to be adjusted is $Q_{N_{adj}}$. $N_{adj}$ is the number of powers to be adjusted, and is equivalent to the location of the sorted powers. If $N_{adj}=1$, the power to be adjusted initially is $Q_1$.

Step 25. Calculate the second surplus power $P_{left2}$:

$$P_{left2} = \left(\sum P_{adj} - P_{left1}\right)/N_{adj},$$

where, $$\sum P_{adj} = \sum_{j=1}^{j=N_{adj}} Q_j.$$

Step 26. Judge whether the second surplus power $P_{left2}$ is greater than $Q_{N_{adj}+1}$; if $P_{left2} > Q_{N_{adj}+1}$, perform step 27; otherwise, perform step 212.

Step 27. Obtain, by calculation, the first adjustment factor $\alpha_j$ of each of the powers to be adjusted:

$\alpha_j=P_{left2}/Q_j$.

where, j=1, 2, ..., $N_{adj}$.

Step 28. Adjust, by using the first adjustment factor, all powers in a column that includes the powers to be adjusted:

$P(n,q(j))=\alpha_j \cdot P(n,q(j))$, $1 \le n \le N_{Tx}$, $1 \le j \le N_{adj}$.

Step 29. Adjust the cumulative adjustment factor of the corresponding stream by using the first adjustment factor $\alpha_j$ obtained in step 27:

$\alpha_c(q(j))=\alpha_j \cdot \alpha_c(q(j))$, $1 \le j \le N_{adj}$.

Go back to perform step 22.

Step 210. Map a sequence number of a stream corresponding to the column that includes the powers to be adjusted to a subband sequence number and a layer sequence number, and adjust, according to the cumulative adjustment factor obtained in step 29, the original precoding matrix, and adjust, by using the adjusted original precoding matrix, the transmit power of the stream corresponding to the column that includes the powers to be adjusted.

First for the $i^{th}$ stream, where i=1, 2, ..., $N_{subband}L$, if the cumulative adjustment factor $\alpha_c(i) \ne 1$, the corresponding stream sequence number i is mapped to the subband sequence number and the layer sequence number:

$m=\lfloor i/L \rfloor$, $l=i-mL$ where, $\lfloor \cdot \rfloor$ is a round-down function.

That is equivalent to mapping the stream sequence number corresponding to $\alpha_c(q(j))$, $1 \leq j \leq N_{adj}$ to the subband sequence number and the layer sequence number.

Afterward, the cumulative adjustment factor is used to adjust the precoding matrix in a subband mapped to the stream sequence number i, so as to obtain an adjusted precoding matrix $W'_m(n,l)$:

$$W'_m(n,l) = \sqrt{\alpha_c(i)} \cdot W_m(n,l), \ 1 \leq n \leq N_{Tx}, \ i=q(j), \ 1 \leq j \leq N_{adj}.$$

Step 211. Output the adjusted precoding matrix W'. End.

Step 212. Increase the number of streams for adjusting powers: $N_{adj} = N_{adj} + 1$. Go back to perform step 25.

Figure 3:
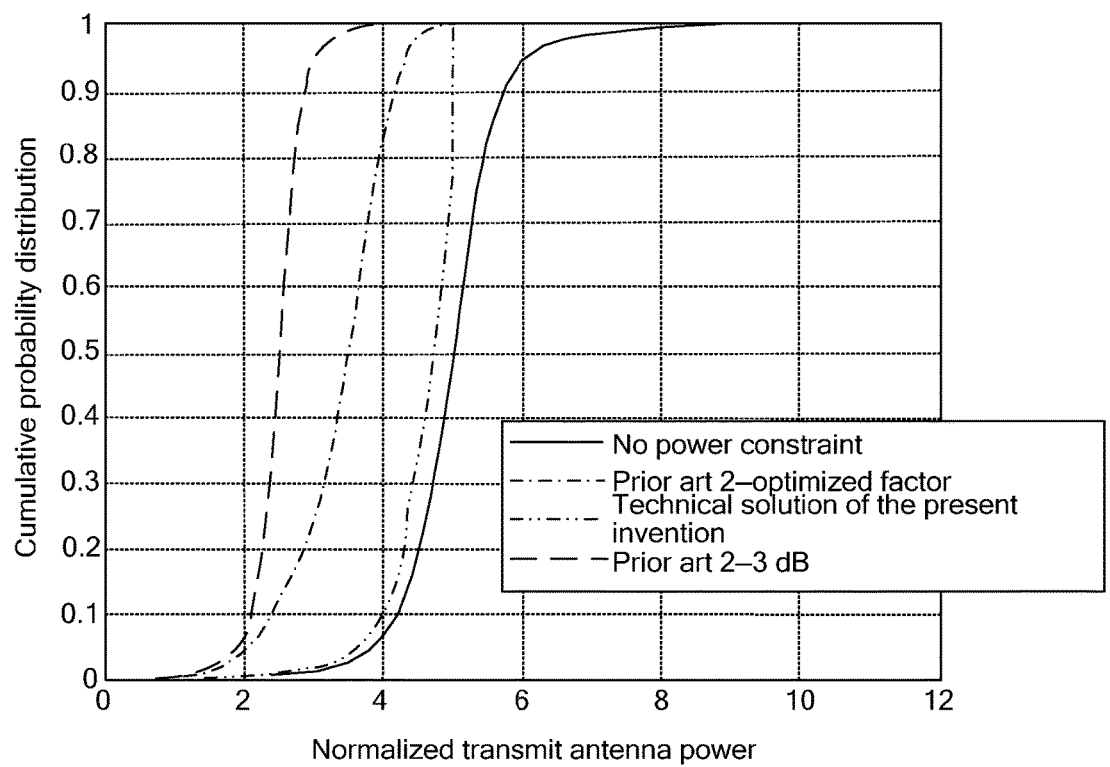
FIG. 3 is a schematic diagram of an emulation result of applying the method for adjusting transmit powers of base station antennas according to the embodiment shown in FIG. 2.

When the foregoing method for adjusting powers of base station antennas is applied to a CoMP transmission scenario, the normalized transmit power of each base station antenna is obtained by emulation, and the statistic results are shown in FIG. 3. In the scenario, the normalized antenna power limit should be less than 5. As seen from FIG. 3, if no power allocation is applied, that is, if no power constraint is imposed, 50% of base station antennas will exceed the power limit; if the prior art is applied to reduce the transmit powers on all antennas evenly, the powers of 80% of the base station antennas will be less than 4, the transmit power capabilities will not be brought into full play, and the performance of coverage and capacity will be reduced; if the technical solution provided in the embodiment of the present invention is applied, the transmit power of no base station antenna will exceed the maximum transmit power limit, and the powers of only about 10% of the base station antennas are less than 4, and therefore the transmit power capabilities are brought into full play and the coverage and capacity performance of the system is improved.

Moreover, as seen from the system emulation result shown in FIG. 3, compared with the prior art, the technical solution provided in the embodiment of the present invention enhances the average throughput of the network by 1.5% and enhances the edge throughput by 3%. In addition, the performance gain depends on the application scenario. As a base station antenna is closer to a noise-limited scenario, the performance gain is higher.

Computing complexity is analyzed in the following table.

| Technical Solution Applied | Analysis on Complex Multiplication Times | Complexity |
| --- | --- | --- |
| Prior art with 3 dB | 28 × 14 × 20/2 | 4K |
| Prior art with an optimized factor | 4K + 28 × 14 × 20/2 | 8K |
| Technical solution provided in the embodiment of the present invention | 4K + 0.13 × (28 × 2 × 20)/2 × 28 + 0.3 × 28 × (14 × 20)/16/4 | 6K |
| Precoding | 14400 × 28 × 14 | 5600K |

As seen from the table, if the prior art is applied, the computing complexity per millisecond (ms) is about 4 thousand (K) to 8K complex multiplication times; if the technical solution provided in the embodiment of the present invention is applied, the computing complexity per ms is about 6K complex multiplication times, which is equivalent to the computing complexity in the prior art. In the precoding in the system, the computing complexity per ms is about 5600K complex multiplication times. Therefore, the computing complexity of the technical solution provided in the embodiment of the present invention is very low, and meets the requirement of engineering implementation.

Embodiment 2

In this embodiment, power allocation is implemented for each stream so as to improve system throughput performance.

Step 1. Perform initialization:

a) Input a precoding matrix W.

b) Set a total target power $P_{target}$, that is, a total power threshold.

c) Set a power compensation factor $\alpha$ ($0 \leq \alpha \leq 1$) and an initial value of a power allocation parameter $P_0$.

d) Obtain an estimated value $\gamma_u$ of a received signal-to-noise ratio of each UE according to information such as RSRQ.

Step 2. Obtain an initial value of the stream transmit power of each stream according to the estimated value of the received signal-to-noise ratio of each UE.

$$P(m,l) = P_0 / \gamma_{u(m,l)}^{\alpha}, \ 0 \leq m \leq N_{subband}-1, \ 1 \leq l \leq L,$$

where, u(m, l) is the sequence number of the UE in the $L^{th}$ layer of the $m^{th}$ subband.

Step 3. Add up obtained stream transmit powers of all streams to obtain a total antenna transmit power:

$$P_{total} = \sum_{m=0}^{N_{subband}-1} \sum_{l=1}^{L} P(m, l).$$

Step 4. Divide the total power threshold by the total antenna transmit power to obtain a power allocation adjustment factor:

$c = P_{target}/P_{total}.$

Step 5. Calculate the power allocation factor of each stream:

$\beta(m,l) = \sqrt{c \cdot P(m,l)}.$

To improve coverage performance, more powers may be allocated to users at the edge of a cell. When the signal-to-noise ratio of the users at the center of the cell is very high, the powers allocated to the users at the center are reduced to a proper extent, which almost has no impact on the throughput of such users. The saved powers are allocated to the users at the edge of the cell, which accomplishes a relatively significant rise of throughput and improves system capacity on the whole.

Step 6. Implement power adjustment for each stream:

$$W'_m(n,l) = \beta(m,l) \cdot W_m(n,l), \ 0 \leq m \leq N_{subband}-1, \ 1 \leq n \leq N_{Tx}, \ 1 \leq l \leq L.$$

Step 7. Output the precoding matrix W'. End.

In the technical solution provided in the embodiment of the present invention, a stream transmit power is adjusted by using a power allocation factor obtained according to an estimated value of a received signal-to-noise ratio of a UE; compared with the prior art that reduces powers evenly, the technical solution of the present invention does not need to reduce all stream transmit powers, and the power limit requirement can be fulfilled by reducing only a small portion of the stream transmit powers that have the greatest impact on the transmit power. Therefore, it is ensured that a majority of streams are transmitted at a relatively high power, and relatively high throughput performance is achieved.

Embodiment 3

In this embodiment, the power adjustment method in Embodiment 2 is first used to optimize the system throughput performance, and then the power adjustment method in Embodiment 1 is used to satisfy the maximum transmit power limit, so that the overall performance is optimized. Moreover, the subbands are grouped to reduce the computing complexity. In each subband group, power adjustment is implemented for each stream respectively, as detailed below, grouping all subbands into Q groups ($1 \leq Q \leq N_{subband}$), where the $q^{th}$ subband group includes $N_q$ subbands:

$$\sum_{q=1}^{Q} N_q = N_{subband}$$

for each subband group q, using the method similar to Embodiment 2 to perform power adjustment for $N_q L$ streams; grouping all subbands into R groups ($1 \leq R \leq N_{subband}$), where the $r^{th}$ subband group includes $N_r$ subbands:

$$\sum_{r=1}^{R} N_r = N_{subband}$$

for each subband group r, using the method similar to Embodiment 1 to perform power adjustment for $N_r L$ streams.

In this embodiment of the present invention, the power adjustment method in Embodiment 2 is first used to optimize system throughput performance, and then the power adjustment method in Embodiment 1 is used to satisfy the maximum transmit power limit. Moreover, the subbands are grouped. In each subband group, the power adjustment is implemented for each stream respectively to reduce computing complexity.

A person of ordinary skill in the art may understand that, all or a part of the steps in each of the foregoing method embodiments may be implemented by a program instructing relevant hardware. The aforementioned program may be stored in a computer readable storage medium. When the program runs, the steps of the foregoing method embodiments are performed. The foregoing storage medium includes various media capable of storing program codes, such as a read-only memory (ROM), a random-access memory (RAM), a magnetic disk, or an optical disk.

Figure 4:
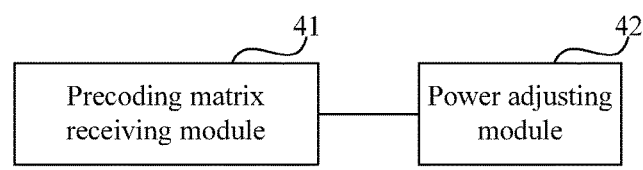
FIG. 4 is a schematic structural diagram of an apparatus for adjusting transmit powers of base station antennas according to an embodiment of the present invention.

FIG. 4 is a schematic structural diagram of an apparatus for adjusting transmit powers of base station antennas according to an embodiment of the present invention. The apparatus for adjusting transmit powers of base station antennas in this embodiment is used to implement the method provided in the embodiment shown in FIG. 1. As shown in FIG. 4, the apparatus includes a precoding matrix receiving module 41 and a power adjusting module 42.

The precoding matrix receiving module 41 is configured to receive an input precoding matrix of a transmit power-limited antenna set, where the precoding matrix is determined according to a scheduling result of a UE communicating with a base station in each layer of each subband in a system. The power adjusting module 42 is configured to adjust the precoding matrix according to a transmit power limit requirement of the transmit power-limited antenna set, a system capacity improvement requirement, or a coverage performance improvement requirement to obtain an adjusted precoding matrix, and adjust a stream transmit power of the transmit power-limited antenna set by using the adjusted precoding matrix, where the stream transmit power of the transmit power-limited antenna set is a sum of powers for transmitting a stream of the transmit power-limited antenna set on all antennas in the transmit power-limited antenna set, and the stream is data sent in a layer of a subband in the system to the UE. The stream corresponds to a layer of a subband in an OFDMA system, and the transmit power of an antenna is in proportion to a sum of modulus squares of elements of precoding vectors of all layers of all subbands on the antenna.

The power adjusting module 42 may include a power matrix obtaining submodule, a largest antenna power obtaining submodule, and a stream power adjusting submodule.

The power matrix obtaining submodule is configured to obtain a power matrix according to the precoding matrix, where a sum of powers in a row of the power matrix is an antenna transmit power of an antenna, a sum of powers in a column is a stream transmit power of a stream, and the stream is a layer of a subband in the transmit power-limited antenna set.

The largest antenna power obtaining submodule is configured to obtain a largest antenna transmit power according to the power matrix.

The stream power adjusting submodule is configured to adjust, by using the largest antenna transmit power and a preset antenna power threshold, the precoding matrix to obtain an adjusted precoding matrix, and adjust a stream transmit power of at least one stream by using the adjusted precoding matrix, where the stream transmit power of each of the at least one stream corresponds to each of at least one column of the power matrix, and the at least one column is at least one column that comes first in the power matrix after all columns are sorted in descending order of powers in a row that has the largest antenna transmit power.

The stream power adjusting submodule may be configured to subtract the antenna power threshold from the largest antenna transmit power to obtain a first surplus power; subtract the first surplus power from a sum of powers to be adjusted in a first specific row, and divide a result of the subtraction by the number of powers to be adjusted to obtain a second surplus power, where the first specific row is a row in which a sum of powers is the largest antenna transmit power in the power matrix, the power to be adjusted is a first power in the first specific row after all powers are sorted in descending order, and the number of powers to be adjusted is 1; if the second surplus power is greater than the first power, divide the second surplus power respectively by each of the powers to be adjusted to obtain a first adjustment factor of each of the powers to be adjusted, where powers in a same column of the power matrix have a same adjustment factor, and the first power is the largest power other than the powers to be adjusted in the first specific row; multiply the first adjustment factor by a second adjustment factor to obtain a cumulative adjustment factor, where the second adjustment factor is an original cumulative adjustment factor of each of the powers to be adjusted; and adjust the precoding matrix according to the obtained cumulative adjustment factor, and adjust, by using the adjusted precoding matrix, a stream transmit power corresponding to a column that includes the powers to be adjusted.

Alternatively, the stream power adjusting submodule is further configured to, if the second surplus power is not greater than the first power, add the first power to the powers to be adjusted; after the number of powers to be adjusted increases by 1, subtract the first surplus power from the sum of powers to be adjusted in the first specific row, and then divide a result of the subtraction by the number of powers to be adjusted until the second surplus power is greater than the first power.

Alternatively, after the dividing the second surplus power respectively by each of the powers to be adjusted and before the multiplying the first adjustment factor by the second adjustment factor, the stream power adjusting submodule is further configured to adjust, by using the first adjustment factor, all powers in the column that comprises the powers to be adjusted to obtain a new power matrix; and obtain a largest antenna transmit power according to the new power matrix; if the largest antenna transmit power is not greater than an antenna power threshold, multiply the first adjustment factor by the second adjustment factor to obtain a cumulative adjustment factor, adjust the precoding matrix according to the obtained cumulative adjustment factor, and adjust, by using the adjusted precoding matrix, the stream transmit power corresponding to the column that comprises the powers to be adjusted; and if the largest antenna transmit power is greater than the antenna power threshold, adjust, by using the largest antenna transmit power and the preset antenna power threshold, the precoding matrix to obtain an adjusted precoding matrix, and adjust the stream transmit power of at least one stream by using the adjusted precoding matrix.

The stream power adjusting submodule adjusts, by using the first adjustment factor, all powers in the column that includes the powers to be adjusted, and obtains a largest antenna transmit power according to the power matrix. The stream power adjusting submodule adjusts, by using the largest antenna transmit power and a preset antenna power threshold, the precoding matrix to obtain an adjusted precoding matrix, and adjusts a stream transmit power of at least one stream by using the adjusted precoding matrix, and then the largest antenna power obtaining submodule obtains the largest antenna transmit power according to the power matrix.

Alternatively, the stream power adjusting submodule is configured to map a sequence number of a stream corresponding to the column that includes the powers to be adjusted to a subband sequence number and a layer sequence number, and adjust, according to the obtained cumulative adjustment factor, the precoding matrix in a subband mapped to the sequence number of the stream corresponding to the column that includes the powers to be adjusted.

Alternatively, the power adjusting module 42 may include a signal-to-noise ratio estimating submodule configured to obtain an estimated value of a received signal-to-noise ratio of each UE according to RSRQ; an allocation factor obtaining submodule configured to obtain a power allocation factor of each stream according to a total power threshold and the estimated value of the received signal-to-noise ratio of each UE; and a first stream power adjusting submodule configured to adjust the precoding matrix by using the power allocation factor, and adjust a stream transmit power of each stream respectively by using the adjusted precoding matrix, so that the antenna transmit power meets the system capacity improvement requirement or the coverage performance improvement requirement.

Alternatively, the allocation factor obtaining submodule is configured to obtain the stream transmit power of each stream by using the estimated value of the received signal-to-noise ratio of each UE; add up obtained stream transmit powers of all streams to obtain a total antenna transmit power; divide the total power threshold by the total antenna transmit power to obtain a power allocation adjustment factor; and multiply the power allocation adjustment factor by the stream transmit power of each stream respectively, and extract a square root to obtain a power allocation factor of each stream.

Alternatively, the apparatus provided in the embodiment of the present invention further includes a first grouping submodule configured to group all subbands into Q first subband groups before the signal-to-noise ratio estimating submodule obtains the estimated value of the received signal-to-noise ratio of each UE according to the RSRQ, where Q is an integer greater than 1.

Correspondingly, the allocation factor obtaining submodule is further configured to obtain a power allocation factor of each stream in each first subband group respectively according to the total power threshold and the estimated value of the received signal-to-noise ratio of each UE.

The first stream power adjusting submodule is further configured to adjust the precoding matrix by using the power allocation factor, and adjust the stream transmit power of each stream in each first subband group respectively by using the adjusted precoding matrix.

Alternatively, the apparatus provided in the embodiment of the present invention further includes a second grouping submodule, a group power matrix obtaining submodule, a group antenna power obtaining submodule, and a second stream power adjusting submodule.

The second grouping submodule is configured to group all subbands into R second subband groups after the first stream power adjusting submodule adjusts the precoding matrix by using the power allocation factor and adjusts the stream transmit power of each stream in each first subband group respectively by using the adjusted precoding matrix, where R is an integer greater than 1.

The group power matrix obtaining submodule is configured to obtain a subband group power matrix corresponding to each second subband group according to the precoding matrix, where a sum of powers in a row of the subband group power matrix is an antenna transmit power of a second subband group part of an antenna, a sum of powers in a column is a stream transmit power of a stream, and the stream is a layer of a subband in the transmit power-limited antenna set.

The group antenna power obtaining submodule obtains a largest antenna transmit power of the second subband group part in each second subband group respectively according to the subband group power matrix.

The second stream power adjusting submodule adjusts the precoding matrix by using a preset antenna power threshold and the largest antenna transmit power of the second subband group part in each second subband group, and adjusts stream transmit powers of R stream groups respectively by using the adjusted precoding matrix, where a stream group is at least one stream in a second subband group, a stream transmit power of a stream group is a stream transmit power corresponding to a part of columns in a corresponding subband group power matrix, and the part of columns in the corresponding subband group power matrix are at least one column, which, after all columns are sorted in descending order of powers in a row that has the largest antenna transmit power of the second subband group part, comes first in the subband group power matrix corresponding to a second subband group that includes the stream group.

Alternatively, the second stream power adjusting submodule is configured to subtract an average antenna power threshold from the largest antenna transmit power of the second subband group part in each second subband group to obtain a first surplus power, where the average antenna power threshold is a value obtained by dividing the preset antenna power threshold by R; subtract the first surplus power from a sum of powers to be adjusted in a first specific row of each subband group power matrix, and divide a result of the subtraction by the number of powers to be adjusted to obtain a second surplus power, where the first specific row is a row in which a sum of powers is the largest antenna transmit power of the second subband group part in each subband group power matrix, and the powers to be adjusted are at least one power that comes first in the first specific row after all powers are sorted in descending order; if the second surplus power is greater than the first power, divide the second surplus power respectively by each of the powers to be adjusted to obtain a first adjustment factor of each of the powers to be adjusted, where powers in a same column of the subband group power matrix have a same adjustment factor, and the first power is the largest power other than the powers to be adjusted in the first specific row; multiply the first adjustment factor by a second adjustment factor to obtain a cumulative adjustment factor, where the second adjustment factor is an original cumulative adjustment factor of each of the powers to be adjusted; and adjust the precoding matrix according to the obtained cumulative adjustment factor, and adjust, by using the adjusted precoding matrix, a stream transmit power corresponding to a column that includes the powers to be adjusted in each second subband group.

Alternatively, the second stream power adjusting submodule is further configured to, if the second surplus power is not greater than the first power, add the first power to the powers to be adjusted; subtract the first surplus power from the sum of powers to be adjusted in the first specific row of each subband group power matrix, and then divide a result of the subtraction by the number of powers to be adjusted.

Alternatively, after the dividing the second surplus power respectively by each of the powers to be adjusted and before the multiplying the first adjustment factor by the second adjustment factor, the second stream power adjusting submodule is further configured to adjust, by using the first adjustment factor, all powers in the column that comprises the powers to be adjusted, obtain a largest antenna transmit power of the second subband group part in each second subband group respectively according to the subband group power matrix, adjust, by using the largest antenna transmit power of the second subband group part in each second subband group and a preset antenna power threshold, the precoding matrix to obtain an adjusted precoding matrix, and adjust the stream transmit powers of R stream groups respectively by using the adjusted precoding matrix.

Alternatively, the second stream power adjusting submodule is configured to map a sequence number of a stream corresponding to the column that includes the powers to be adjusted in each second subband group to a subband sequence number and a layer sequence number, and adjust, according to the cumulative adjustment factor, the precoding matrix in a subband mapped to the sequence number of the stream corresponding to the column that includes the powers to be adjusted.

An embodiment of the present invention provides a base station, which includes antennas and any one apparatus for adjusting transmit powers of base station antennas according to the foregoing embodiments, where the apparatus for adjusting transmit powers of base station antennas is used to adjust the transmit powers of the antennas.

Figure 5:
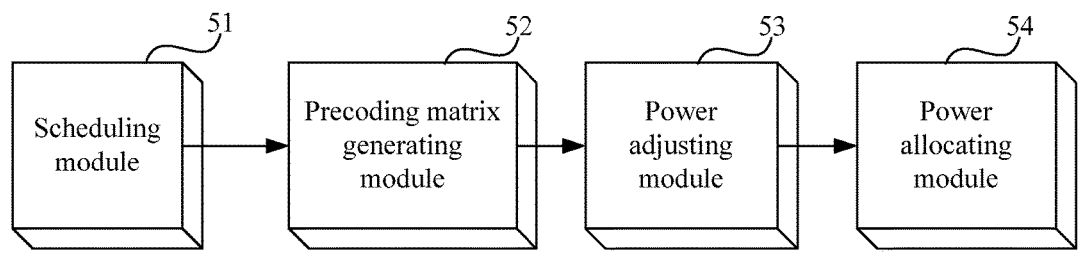
FIG. 5 is a schematic structural diagram of a base station according to an embodiment of the present invention.

As shown in FIG. 5, in this embodiment, the base station includes a scheduling module 51, a precoding matrix generating module 52, a power adjusting module 53, and a power allocating module 54. The power adjusting module 53 may be any one apparatus for adjusting transmit powers of base station antennas according to the foregoing apparatus embodiments.

First, the scheduling module 51 uses a scheduling algorithm to calculate and determine a UE in each layer of each subband.

The scheduling algorithm comes in multiple types, and typical conventional scheduling algorithms include round robin scheduling and proportional fair scheduling. Taking a simplest round robin scheduling algorithm as an example, the implementation method is as follows: Firstly, the number of UEs that need to transmit data is J, and the UEs are sorted as: $UE_1, UE_2, \ldots, UE_J$; for each layer of each subband, a UE is scheduled in order, that is, if $UE_j$ ($1 \leq j \leq J$) is scheduled previously, $UE_{j+1}$ needs to be scheduled for the layer of the subband at this time; and if $UE_J$ is scheduled previously, $UE_1$ is scheduled again for the layer of the subband at this time until the UEs in all layers of all subbands are determined.

Secondly, the precoding matrix generating module 52 generates an original precoding matrix according to the scheduling result, where the original precoding matrix has an equal power in each subband. For example, the precoding matrix generating module 52 generates an original precoding matrix W, which includes the original precoding matrix $W_m$ (m=1, 2, ..., M) of M subbands. The original precoding matrix W does not take the maximum antenna power limit into account.

Afterward, the power adjusting module 53 obtains a power adjustment factor of each stream by calculation according to a transmit power limit requirement, a system capacity improvement requirement, or a coverage performance improvement requirement, and uses the power adjustment factor to update the precoding matrix. For example, the power adjusting module 53 processes the original precoding matrix W according to the transmit power limit requirement, the system capacity improvement requirement, or the coverage performance improvement requirement to obtain a precoding matrix W' after the power of each stream is adjusted. Similar to W, the precoding matrix W' after the power of each stream is adjusted includes the precoding matrix $W'_m$ (m=1, 2, ..., M) of M subbands, and the relationship between the precoding matrix W' and the original precoding matrix $W_m$ is:

$$W'_m = W_m D_m.$$

where, $D_m$ is a power reduction matrix corresponding to the $m^{th}$ subband, and is a diagonal matrix.

Figure 6:
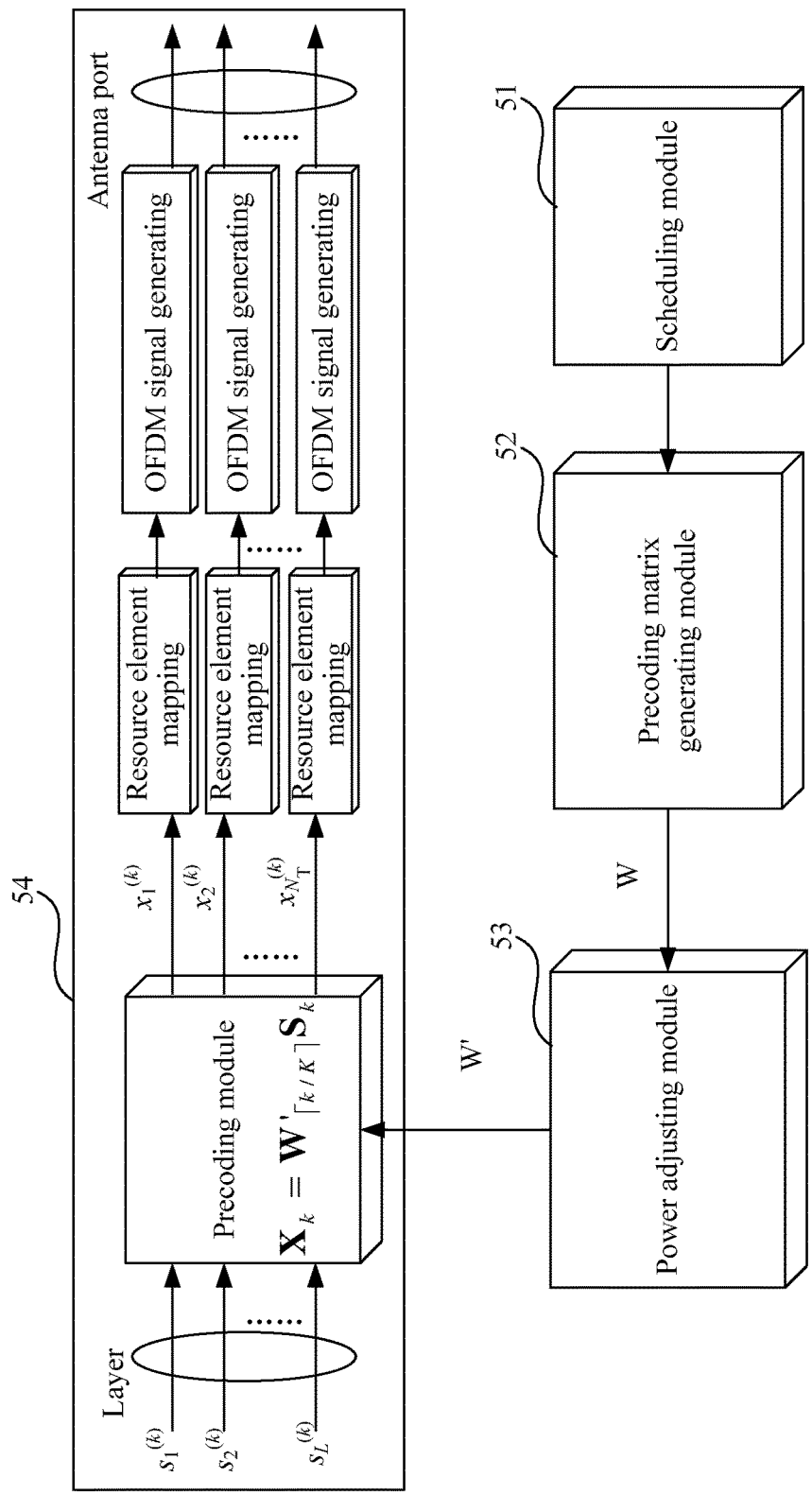
FIG. 6 is a schematic structural diagram of another base station according to an embodiment of the present invention.

Finally, the power allocating module 54 uses the updated precoding matrix to allocate a power to each stream. As shown in FIG. 6, a precoding module uses a precoding matrix of a corresponding subband to weight layer-L data $S_k = [s_1^{(k)} \ s_2^{(k)} \ \ldots \ S_L^{(k)}]^T$ on the $k^{th}$ data subcarrier to obtain data $X_k$ of N antenna ports on the $k^{th}$ data subcarrier:

$$X_k = [x_1^{(k)} \ x_2^{(k)} \ \ldots \ x_{N_T}^{(k)}]^T$$
$$= W'_{\lceil k/K \rceil} S_k,$$

where, K is the number of subcarriers in a subband, and $\lceil \cdot \rceil$ is a round-up function. For each transmit antenna, resource element mapping is performed and OFDM signals are generated respectively to obtain signals of each antenna port.

In the method and apparatus provided in the embodiments of the present invention, a layer of a subband serves as a stream, and a power is allocated by stream, so that different powers can be allocated to each stream. A power is allocated to a stream by multiplying a precoding vector corresponding to the stream by an adjustment factor or a power allocation adjustment factor, which does not cause any change to a spatial characteristic of multi-antenna transmission of the stream. Moreover, the power allocated to a stream is far greater than 0 instead of being equal or close to 0, which does not cause any change to a scheduling result. The method and apparatus embodiments provided in the embodiments of the present invention can adjust the stream transmit powers of only a part of streams, that is, allow the power adjustment factor or power allocation adjustment factor of the other part of streams to be 1, which satisfies the power limit and reduces computing complexity. Moreover, if the stream transmit powers of only a part of streams are adjusted, a part of streams of the greatest power in a power-limited antenna set of a too high power may be first selected for power adjustment, which further reduces computing complexity. In conclusion, while satisfying a power limit, the method and apparatus embodiments provided in the embodiments of the present invention ensure network performance to the utmost extent, reduce computing complexity, bring the transmit power capability of each power-limited antenna set into full play, and improve performance such as coverage and capacity of a radio communication network.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments, or make equivalent replacements to some or all the technical features thereof, without departing from the spirit and scope of the technical solutions of the embodiments of the present invention.

What is claimed is:

1. A method for adjusting transmit powers of base station antennas, comprising:
receiving an input precoding matrix of a transmit power-limited antenna set, wherein the precoding matrix is determined according to a scheduling result of a user equipment communicating with a base station in each layer of each subband in a system;
adjusting the precoding matrix according to a transmit power limit requirement of the transmit power-limited antenna set, a system capacity improvement requirement, or a coverage performance improvement requirement to obtain an adjusted precoding matrix; and
adjusting a stream transmit power of the transmit power-limited antenna set by using the adjusted precoding matrix,
wherein the stream transmit power of the transmit power-limited antenna set is a sum of powers for transmitting a stream of the transmit power-limited antenna set on all antennas in the transmit power-limited antenna set, wherein the stream is data sent in a layer of a sub hand in the system to the user equipment, and
wherein adjusting the precoding matrix according to the transmit power limit requirement of the transmit power-limited antenna set to obtain the adjusted precoding matrix, and adjusting the stream transmit power of the transmit power-limited antenna set by using the adjusted precoding matrix comprise:
obtaining a power matrix according to the precoding matrix, wherein a sum of powers in a row of the power matrix is an antenna transmit power of an antenna, and a sum of powers in a column is a stream transmit power of a stream;
obtaining a largest antenna transmit power according to the power matrix;
adjusting, by using the largest antenna transmit power and a preset antenna power threshold, the precoding matrix to obtain an adjusted precoding matrix; and
adjusting a stream transmit power of at least one stream by using the adjusted precoding matrix,
wherein the stream transmit power of each of the at least one stream corresponds to each of at least one column of the power matrix, and
wherein the at least one column is at least one column that comes first in the power matrix after all columns are sorted in descending order of powers in a row that has the largest antenna transmit power.

2. The method according to claim 1, wherein adjusting, by using the largest antenna transmit power and the preset antenna power threshold, the precoding matrix to obtain the adjusted precoding matrix, and adjusting the stream transmit power of the at least one stream by using the adjusted precoding matrix comprise:
subtracting the antenna power threshold from the largest antenna transmit power to obtain a first surplus power;
subtracting the first surplus power from a sum of powers to be adjusted in a first specific row;
dividing a result of the subtraction by the number of powers to be adjusted to obtain a second surplus power, wherein the first specific row is a row in which a sum of powers is the largest antenna transmit power in the power matrix, the power to be adjusted is a first power in the first specific row after all powers are sorted in descending order, and the number of powers to be adjusted is one;
dividing the second surplus power respectively by each of the powers to be adjusted to obtain a first adjustment factor of each of the powers to be adjusted when the second surplus power is greater than the first power, wherein powers in a same column of the power matrix have a same adjustment factor, and the first power is the largest power other than the powers to be adjusted in the first specific row;
multiplying the first adjustment factor by a second adjustment factor to obtain a cumulative adjustment factor, wherein the second adjustment factor is an original cumulative adjustment factor of each of the powers to be adjusted;
adjusting the precoding matrix according to the obtained cumulative adjustment factor; and
adjusting, by using the adjusted precoding matrix, a stream transmit power corresponding to a column that comprises the powers to be adjusted.

3. The method according to claim 2, wherein adjusting, by using the largest antenna transmit power and the preset antenna power threshold, the precoding matrix to obtain the adjusted precoding matrix, and adjusting the stream transmit power of the at least one stream by using the adjusted precoding matrix further comprise:

adding the first power to the powers to be adjusted when the second surplus power is not greater than the first power;

subtracting the first surplus power from the sum of powers to be adjusted in the first specific row after the number of powers to be adjusted increases by one; and dividing a result of the subtraction by the number of powers to be adjusted until the second surplus power is greater than the first power.

4. The method according to claim 2, wherein after dividing the second surplus power respectively by each of the powers to be adjusted and before multiplying the first adjustment factor by the second adjustment factor, the method further comprises:

adjusting, by using the first adjustment factor, all powers in the column that comprises the powers to be adjusted to obtain a new power matrix;

obtaining a largest antenna transmit power according to the new power matrix;

when the largest antenna transmit power is not greater than an antenna power threshold, multiplying the first adjustment factor by the second adjustment factor to obtain a cumulative adjustment factor, adjusting the precoding matrix according to the obtained cumulative adjustment factor, and adjusting, by using the adjusted precoding matrix, the stream transmit power corresponding to the column that comprises the powers to be adjusted; and when the largest antenna transmit power is greater than the antenna power threshold, adjusting, by using the largest antenna transmit power and the preset antenna power threshold, the precoding matrix to obtain an adjusted precoding matrix, and adjusting the stream transmit power of at least one stream by using the adjusted precoding matrix.

5. The method according to claim 2, wherein adjusting the precoding matrix according to the obtained cumulative adjustment factor comprises:

mapping a sequence number of a stream corresponding to the column that comprises the powers to be adjusted to a subband sequence number and a layer sequence number; and adjusting, according to the obtained cumulative adjustment factor, the precoding matrix in a subband mapped to the sequence number of the stream corresponding to the column that comprises the powers to be adjusted.

6. A method for adjusting transmit powers of base station antennas, comprising:

receiving an input precoding matrix of a transmit power-limited antenna set, wherein the precoding matrix is determined according to a scheduling result of a user equipment communicating with a base station in each layer of each subband in a system;

adjusting the precoding matrix according to a transmit power limit requirement of the transmit power-limited antenna set, a system capacity improvement requirement, or a coverage performance improvement requirement to obtain an adjusted precoding matrix; and adjusting a stream transmit power of the transmit power-limited antenna set by using the adjusted precoding matrix, wherein the stream transmit power of the transmit power-limited antenna set is a sum of powers for transmitting a stream of transmit power-limited antenna set on all antennas in the transmit power-limited antenna set, wherein the stream is data sent in a layer of a subband in the system to the user equipment, and wherein adjusting the precoding matrix according to the system capacity improvement requirement or the coverage performance improvement requirement, and adjusting the stream transmit power by using the adjusted precoding matrix comprise:

obtaining an estimated value of a received signal-to-noise ratio of each user equipment according to reference signal received quality (RSRQ);

obtaining a power allocation factor of each stream according to a total power threshold and the estimated value of the received signal-to-noise ratio of each user equipment;

adjusting the precoding matrix by using the power allocation factor of each stream; and adjusting a stream transmit power of each stream respectively by using the adjusted precoding matrix such that the antenna transmit power meets the system capacity improvement requirement or the coverage performance improvement requirement.

7. The method according to claim 6, wherein obtaining the power allocation factor of each stream according to the total power threshold and the estimated value of the received signal-to-noise ratio of each user equipment comprises:

obtaining the stream transmit power of each stream by using the estimated value of the received signal-to-noise ratio of each user equipment;

adding up obtained stream transmit powers of all streams to obtain a total antenna transmit power;

dividing the total power threshold by the total antenna transmit power to obtain a power allocation adjustment factor;

multiplying the power allocation adjustment factor by the stream transmit power of each stream respectively; and extracting a square root to obtain a power allocation factor of each stream.

8. The method according to claim 6, wherein before obtaining the estimated value of the received signal-to-noise ratio of each user equipment according to the RSRQ, the method further comprises grouping all subbands into Q first subband groups, wherein Q is an integer greater than one, wherein obtaining the power allocation factor of each stream according to the total power threshold and the estimated value of the received signal-to-noise ratio of each user equipment comprises obtaining a power allocation factor of each stream in each first subband group respectively according to the total power threshold and the estimated value of the received signal-to-noise ratio of each user equipment, and wherein adjusting the precoding matrix by using the power allocation factor, and adjusting the stream transmit power of each stream respectively by using the adjusted precoding matrix comprise adjusting the precoding matrix by using the power allocation factor, and adjusting the stream transmit power of each stream in each first subband group respectively by using the adjusted precoding matrix.

9. An apparatus for adjusting transmit powers of base station antennas, comprising:

a non-transitory computer readable medium having instructions stored thereon; and a computer processor coupled to the non-transitory computer readable medium and configured to execute the instructions to:

receive an input precoding matrix of a transmit power-limited antenna set, wherein the precoding matrix is determined according to a scheduling result of a user equipment communicating with a base station in each layer of each subband in a system;

adjust the precoding matrix according to a transmit power limit requirement of the transmit power-limited antenna set, a system capacity improvement requirement, or a coverage performance improvement requirement to obtain an adjusted precoding matrix;

adjust a stream transmit power of the transmit power-limited antenna set by using the adjusted precoding matrix, wherein the stream transmit power of the transmit power-limited antenna set is a sum of powers for transmitting a stream of the transmit power-limited antenna set on all antennas in the transmit power-limited antenna set, and wherein the stream is data sent in a layer of a subband in the system to the user equipment;

obtain a power matrix according to the precoding matrix, wherein a sum of powers in a row of the power matrix is an antenna transmit power of an antenna, a sum of powers in a column is a stream transmit power of a stream, and the stream is a layer of a subband in the transmit power-limited antenna set;

obtain a largest antenna transmit power according to the power matrix;

adjust, by using the largest antenna transmit power and a preset antenna power threshold, the precoding matrix to obtain an adjusted precoding matrix; and adjust a stream transmit power of at least one stream by using the adjusted precoding matrix, wherein the stream transmit power of each of the at least one stream corresponds to each of at least one column of the power matrix, and wherein the at least one column is at least one column that comes first in the power matrix after all columns are sorted in descending order of powers in a row that has the largest antenna transmit power.

10. The apparatus according to claim 9, wherein the computer processor is further configured to execute the instructions to:

subtract the antenna power threshold from the largest antenna transmit power to obtain a first surplus power;

subtract the first surplus power from a sum of powers to be adjusted in a first specific row;

divide a result of the subtraction by the number of powers to be adjusted to obtain a second surplus power, wherein the first specific row is a row in which a sum of powers is the largest antenna transmit power in the power matrix, the power to be adjusted is a first power in the first specific row after all powers are sorted in descending order, and the number of powers to be adjusted is one;

divide the second surplus power respectively by each of the powers to be adjusted to obtain a first adjustment factor of each of the powers to be adjusted when the second surplus power is greater than the first power, wherein powers in a same column of the power matrix have a same adjustment factor, and the first power is the largest power other than the powers to be adjusted in the first specific row;

multiply the first adjustment factor by a second adjustment factor to obtain a cumulative adjustment factor, wherein the second adjustment factor is an original cumulative adjustment factor of each of the powers to be adjusted;

adjust the precoding matrix according to the obtained cumulative adjustment factor; and adjust, by using the adjusted precoding matrix, a stream transmit power corresponding to a column that comprises the powers to be adjusted.

11. The apparatus according to claim 10, wherein the computer processor is further configured to execute the instructions to:

add the first power to the powers to be adjusted when the second surplus power is not greater than the first power;

subtract the first surplus power from the sum of powers to be adjusted in the first specific row after the number of powers to be adjusted increases by one; and divide a result of the subtraction by the number of powers to be adjusted until the second surplus power is greater than the first power.

12. The apparatus according to claim 10, wherein after dividing the second surplus power respectively by each of the powers to be adjusted and before multiplying the first adjustment factor by the second adjustment factor, the computer processor is further configured to execute the instructions to:

adjust, by using the first adjustment factor, all powers in the column that comprises the powers to be adjusted to obtain a new power matrix;

obtain a largest antenna transmit power according to the new power matrix;

when the largest antenna transmit power is not greater than an antenna power threshold, multiply the first adjustment factor by the second adjustment factor to obtain a cumulative adjustment factor, adjust the precoding matrix according to the obtained cumulative adjustment factor, and adjust, by using the adjusted precoding matrix, the stream transmit power corresponding to the column that comprises the powers to be adjusted; and when the largest antenna transmit power is greater than the antenna power threshold, adjust, by using the largest antenna transmit power and the preset antenna power threshold, the precoding matrix to obtain an adjusted precoding matrix, and adjust the stream transmit power of at least one stream by using the adjusted precoding matrix.

13. The apparatus according to claim 10, wherein the computer processor is further configured to execute the instructions to:

map a sequence number of a stream corresponding to the column that comprises the powers to be adjusted to a subband sequence number and a layer sequence number; and adjust, according to the obtained cumulative adjustment factor, the precoding matrix in a subband mapped to the sequence number of the stream corresponding to the column that comprises the powers to be adjusted.

14. An apparatus for adjusting transmit powers of base station antennas, comprising:

a non-transitory computer readable medium having instructions stored thereon; and a computer processor coupled to the non-transitory computer readable medium and configured to execute the instructions to:

receive an input precoding matrix of a transmit power-limited antenna set, wherein the precoding matrix is determined according to a scheduling result of a user equipment communicating with a base station in each layer of each subband in a system;

adjust the precoding matrix according to a transmit power limit requirement of the transmit power-limited antenna set, a system capacity improvement requirement, or a coverage performance improvement requirement to obtain an adjusted precoding matrix;

adjust a stream transmit power of the transmit power-limited antenna set by using the adjusted precoding matrix, wherein the stream transmit power of the transmit power-limited antenna set is a sum of powers for transmitting a stream of the transmit power-limited antenna set on all antennas in the transmit power-limited antenna set, and wherein the stream is data sent in a layer of a subband in the system to the user equipment;

obtain an estimated value of a received signal-to-noise ratio of each user equipment according to reference signal received quality (RSRQ);

obtain a power allocation factor of each stream according to a total power threshold and the estimated value of the received signal-to-noise ratio of each user equipment;

adjust the precoding matrix by using the power allocation factor; and adjust a stream transmit power of each stream respectively by using the adjusted precoding matrix such that the antenna transmit power meets the system capacity improvement requirement or the coverage performance improvement requirement.

15. The apparatus according to claim 14, wherein the computer processor is further configured to execute the instructions to:

obtain the stream transmit power of each stream by using the estimated value of the received signal-to-noise ratio of each user equipment;

add up obtained stream transmit powers of all streams to obtain a total antenna transmit power;

divide the total power threshold by the total antenna transmit power to obtain a power allocation adjustment factor;

multiply the power allocation adjustment factor by the stream transmit power of each stream respectively; and extract a square root to obtain a power allocation factor of each stream.

16. The apparatus according to claim 14, wherein the computer processor is further configured to execute the instructions to:

divide all subbands into Q first subband groups before the signal-to-noise ratio estimating submodule obtains the estimated value of the received signal-to-noise ratio of each user equipment according to the RSRQ, wherein Q is an integer greater than one;

obtain a power allocation factor of each stream in each first subband group respectively according to the total power threshold and the estimated value of the received signal-to-noise ratio of each user equipment;

adjust the precoding matrix by using the power allocation factor; and adjust the stream transmit power of each stream in each first subband group respectively by using the adjusted precoding matrix.

17. The apparatus according to claim 16, wherein the computer processor is further configured to:

group all subbands into R second subband groups after the first stream power adjusting submodule adjusts the precoding matrix by using the power allocation factor and adjusts the stream transmit power of each stream in each first subband group respectively by using the adjusted precoding matrix, wherein R is an integer greater than one;

obtain a subband group power matrix corresponding to each second subband group according to the precoding matrix, wherein a sum of powers in a row of the subband group power matrix is an antenna transmit power of a second subband group part of an antenna, a sum of powers in a column is a stream transmit power of a stream, and the stream is a layer of a subband in the transmit power-limited antenna set;

obtain a largest antenna transmit power of the second subband group part in each second subband group respectively according to the subband group power matrix; and adjust the precoding matrix by using a preset antenna power threshold and the largest antenna transmit power of the second subband group part in each second subband group; and adjust stream transmit powers of R stream groups respectively by using the adjusted precoding matrix, wherein a stream group is at least one stream a second subband group, a stream transmit power of a stream group is a stream transmit power corresponding to a part of columns in a corresponding subband group power matrix, and the part of columns in the corresponding subband group power matrix are at least one column, which, after all columns are sorted in descending order of powers in a row that has the largest a transmit power of the second subband group part, comes first in the subband group power matrix corresponding to a second subband group that comprises the stream group.

* * * * *

UNITED STATES PATENT AND TRADEMARK OFFICE
CERTIFICATE OF CORRECTION

PATENT NO. : 9,537,553 B2
APPLICATION NO. : 14/597524
DATED : January 3, 2017
INVENTOR(S) : Lu Rong and Dageng Chen It is certified that error appears in the above-identified patent and that said Letters Patent is hereby corrected as shown below:

In the Claims

Column 19, Line 64, Claim 1 should read:

"wherein the stream is data sent in a layer of a subband in the system to the user equipment, and"

Signed and Sealed this
Eleventh Day of April, 2017

Michelle K. Lee
*Director of the United States Patent and Trademark Office*